Figure 1:
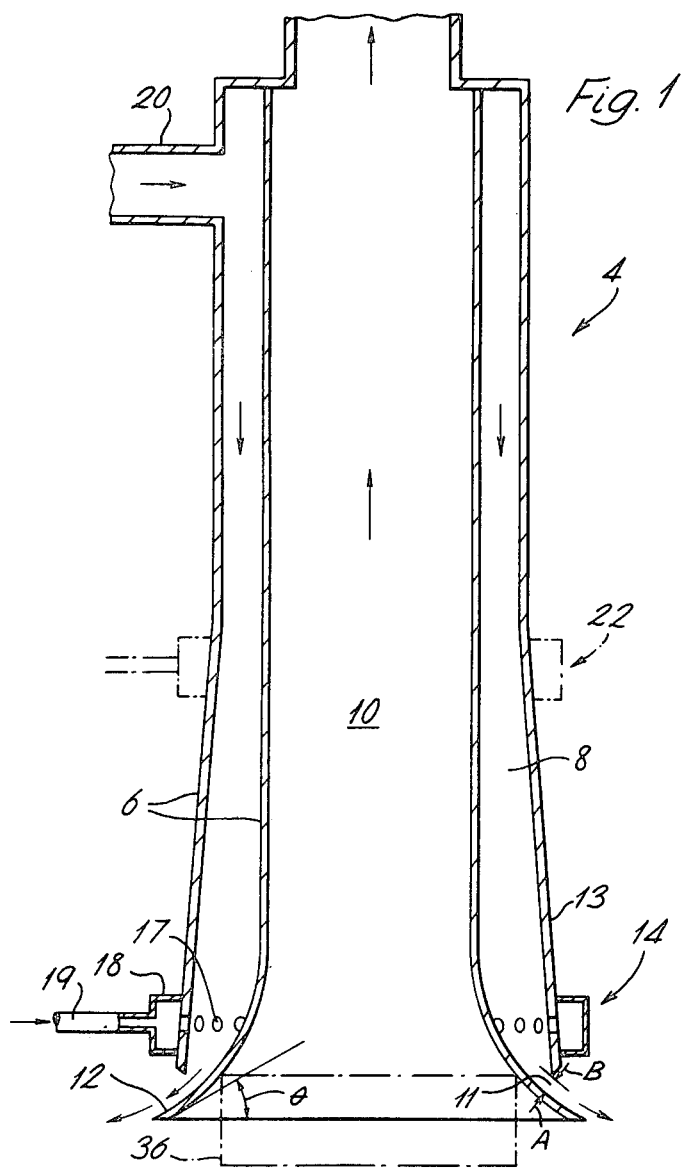

United States Patent [19]

Irving

[11] 4,230,570

[45] Oct. 28, 1980

[54] AERATOR

[75] Inventor: Stephen J. Irving, St. Albans, England

[73] Assignee: National Research Development Corporation, London, England

[21] Appl. No.: 965,438

[22] Filed: Dec. 1, 1978

[30] Foreign Application Priority Data

Dec. 2, 1977 [GB] United Kingdom ............... 50312/77

[51] Int. Cl.² ........................... C02B 3/08; B01F 3/04
[52] U.S. Cl. ................................. 210/758; 210/194;
  210/220; 210/242 A; 261/77; 261/DIG. 75
[58] Field of Search .................... 210/14, 15, 60, 63 R,
  210/194, 197, 220, 221 R, 242 A; 261/36 R, 77,
  121 R, DIG. 75

[56] References Cited

U.S. PATENT DOCUMENTS

| 323,325 | 7/1885 | Hambruch | 261/36 R |
|---|---|---|---|
| 895,229 | 8/1908 | Beddoes | 210/15 |
| 1,900,809 | 3/1933 | Hammerly | 210/221 R X |
| 2,630,749 | 3/1953 | Ball et al. | 261/77 X |
| 3,855,367 | 12/1974 | Webb | 261/77 |
| 4,043,913 | 8/1977 | Hintermeister | 210/220 X |
| 4,044,079 | 8/1977 | Tveit | 261/36 R |
| 4,051,204 | 9/1977 | Muller et al. | 261/36 R |
| 4,086,306 | 4/1978 | Koshinaga | 261/36 R X |

FOREIGN PATENT DOCUMENTS

| 335927 | 4/1977 | Austria . | |
|---|---|---|---|
| 1056594 | 3/1954 | France | 261/77 |
| 1504576 | 12/1967 | France . | |
| 2232356 | 1/1975 | France . | |
| 462418 | 3/1951 | Italy | 261/121 R |

*Primary Examiner*—Robert H. Spitzer
*Attorney, Agent, or Firm*—Cushman, Darby & Cushman

[57] ABSTRACT

An aerator for the treatment of liquid by immersion in the liquid to form in the liquid a liquid stream and introduced gas bubbles. The stream is to be produced with efficient use of power to have sufficient bubbles small enough to avoid waste by bubbles reaching the surface too quickly. The aerator has a pressure chamber (49), with a liquid inlet and gas inlets (422) positioned between the liquid inlet and a restricted outlet throat (47) associated with a chamber wall surface (44) arranged to direct an outlet stream deflected from the liquid inlet direction. The aerator can be formed without immersed moving parts by two tubes, a smaller inner one (41) expanding toward an outer larger one (42) to define the throat and pressure chamber and wall surface. The gas supply is applied through holes large enough to resist algal obstruction at a position where the gas and water enter a part of the pressure chamber of reducing cross-section for subsequent deflection out of the throat.

11 Claims, 7 Drawing Figures

AERATOR

This invention relates to a device for the aeration of a liquid, that is the introduction of a gas into a volume or body of liquid.

The need to introduce a gas into a body of liquid arises in various chemical and other procedures. Examples of these are the oxygenation of water, whether contained, e.g. in a tank, or in the open, e.g. a river or reservoir, and the treatment of a liquid with a reactive or inert gas to bring about a reaction or stirring or mixing. In each case energy must be supplied to introduce the gas and to move liquid. To reduce energy costs and capital costs for pumps and other plant it is desirable that the gas introduction procedure should be as efficient as possible. Furthermore to reduce the occurrence of breaks in a continuous procedure the plant should be simple and preferably not liable to be clogged or jammed by sediment, algal growths or wear of moving parts.

One application of aeration is in water treatment.

Efficient oxygen transfer is a vital stage in the water treatment industry whether for waste or sweet water. The currently available types of aeration equipment can be broadly divided into two main groups—dispersed air units and surface aerator units. Dispersed air units work by injecting compressed air at the base of a liquid-containing tank through some form of porous medium. Surface aerator units, on the other hand, use rotary agitators which operate near the surface of the liquid to entrain air bubbles into the liquid where they then go into solution.

The principal disadvantage of dispersed air units is the need for a special tank (with a porous base) and the consequent tendency for these pores to become blocked with use. Surface aerator units suffer from the disadvantage that the agitators can produce spray, which may be environmentally unacceptable, and need big support structures which are subject to vibration and fatigue problems, as well as erosion where a corrosive liquid is being treated.

It is an object of the present invention to provide an efficient, simple aeration device in which the above disadvantages are reduced or eliminated.

According to the invention there is provided an aerator arrangement including an aerator body having a pressure chamber with a first forced liquid inlet, an opposite pressure chamber wall directed obliquely to the first inlet and between the first inlet and said opposite wall a second gas inlet and a restricted chamber outlet of a throat fixedly directed away from the direction of the first inlet, the arrangement being such that liquid and gas supplied to the aerator produce a chamber outlet stream deflected from the first inlet direction of liquid and gas introduced therein to form bubbles in the outlet stream.

A liquid inlet stream is preferably constrained to flow in a substantially regular manner for example by a straight full-bore conduit to the inlet of the chamber. The gas inlet is preferably positioned in the chamber wall between the liquid inlet and the throat and nearer to the throat than to the position of the liquid inlet. The throat may be of uniform size along the outlet stream flow direction or taper towards the outlet end. The throat may have a dimension along the outlet flow direction no more than the minimum transverse dimension of the throat. The throat may include a wall surface of knife edge form. The knife edge may be uniform or serrated.

In one constructional form the aerator may be formed by two tubes of different diameter, a smaller one disposed inside a larger one and along the longitudinal axis, the smaller tube expanding toward the larger adjacent one end thereof to define the throat. The smaller tube may expand as a flare beyond the larger one and the larger tube may have an end formed to co-operate with the flare or an intermediate portion thereof to form a tapering throat. The flare may have a terminal angle ($\theta$) of between 20° and 60° to the flare mouth. There may be an annular duct between the smaller and larger tubes divided for part of its length to provide liquid flow straightener elements. The elements may be radial plates or a number of tubes fitted around the annulus. The pressure chamber may be a ring-shaped cavity bounded in part by the expanding portion of the smaller tube. The cavity may be open away from the expanding portion to form the liquid inlet. The larger tube forming part of the cavity wall may be perforated with a row of gas inlets. A gas supply manifold may surround these inlets outside the larger tube. The smaller tube may provide a reverse liquid flow path past the throat and cavity.

According to a particular aspect of the present invention an aerator arrangement includes a double-walled vessel defining a core portion open at what in operation of the device will be the lower end of the core portion, an annular chamber surrounding the core portion, a shaped discharge outlet at what in operation of the device will be the lower end of the annular chamber, first inlet means for introducing a liquid flow at what in operation of the device will be the upper end of the annular chamber, and a second inlet means for introducing gas into a region of the annular chamber spaced from said upper and lower ends of the chamber, the shaped discharge outlet having a surface effective in operation of the device to encourage fluid leaving the outlet to flow away from the core portion of the device whereby in operation of the device to aerate a liquid, a liquid/gas mixture discharged from the outlet will tend to circulate through a substantial part of the liquid in which the device is immersed in response to a circulatory flow of said liquid upwardly through the core portion of the device and subsequently downwardly through the annular chamber where the gas is introduced into the flow at the second inlet means.

In preferred embodiments of the invention, the lower surface of the discharge outlet forms part of a generally bell-like shape whilst the upper surface of the outlet is provided by a relatively steep surface terminating close to the lower surface at a region spaced from the bottom edge of the lower surface.

The bottom edge of the lower surface of the outlet may be serrated or otherwise formed in such a way as to increase the turbulence of fluid leaving the outlet in operation of the device.

In a preferred self-contained form an aerator as described above may be mounted on a support such as a float or vessel or ground-borne structure for immersion of the throat below a liquid surface and provided with a prime mover or power supply to feed compressed gas and to pump liquid to the aerator to apply an aerating outlet stream of gas and liquid into the liquid in which it is immersed.

According to the invention there is also provided a method of aerating a volume of liquid, including drawing from the volume a supply of liquid, causing the supply of liquid to flow down a conduit into the volume of liquid along a full-bore liquid path, causing the liquid flow to be diverted by a surface placed obliquely across the conduit and restricting the conduit to an outlet throat fixedly directed away from the conduit direction, causing or permitting gas to be introduced into the liquid flow in the conduit in the region of the restriction and not downstream of the throat to emerge as a stream of liquid and bubbles of introduced gas with momentum provided by the liquid supply flow and directed by the oblique surface to carry the bubbles downwardly and outwardly in a liquid aerating sense.

Figure 2:
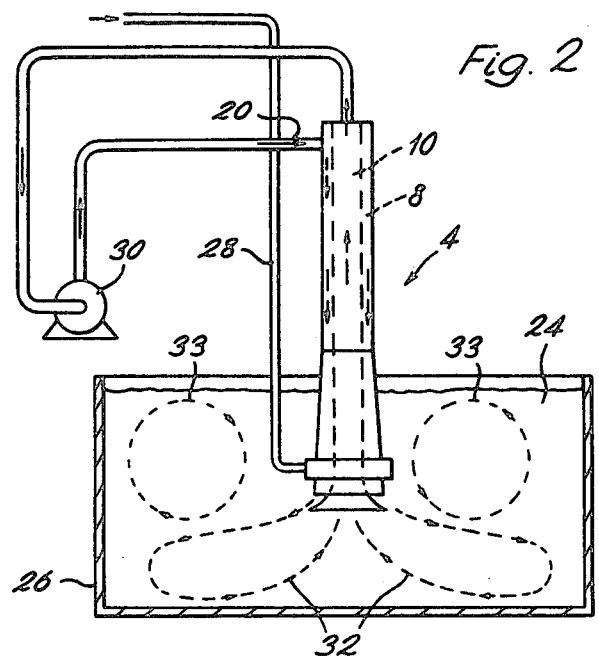
Figure 3:
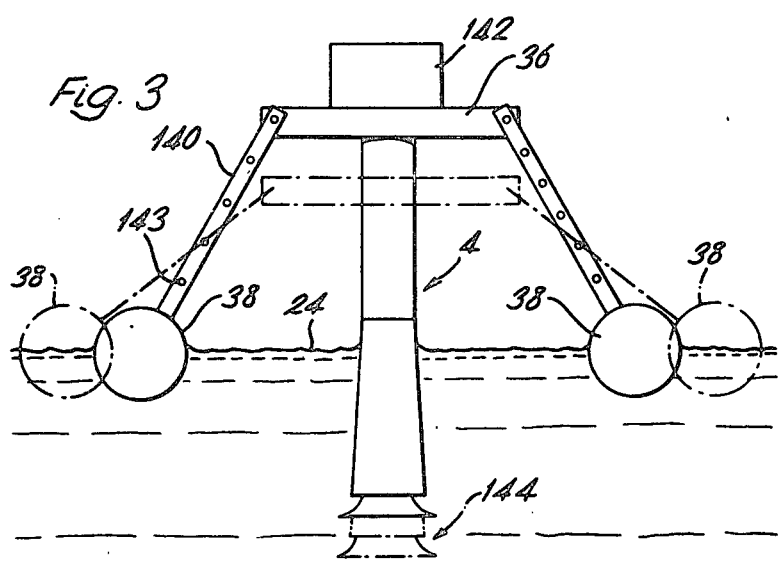
Figure 5:
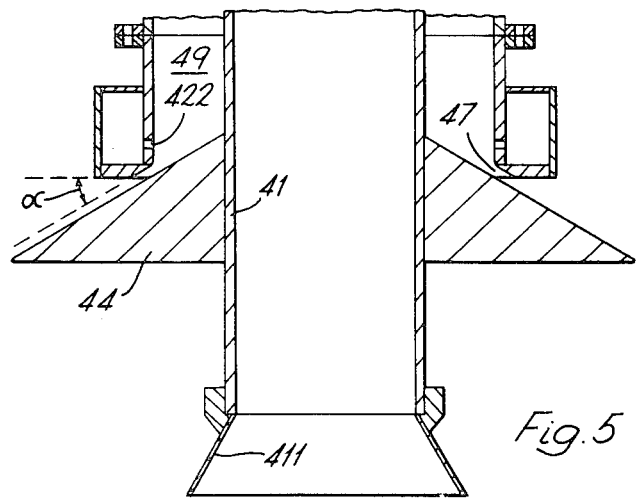
Figure 6:
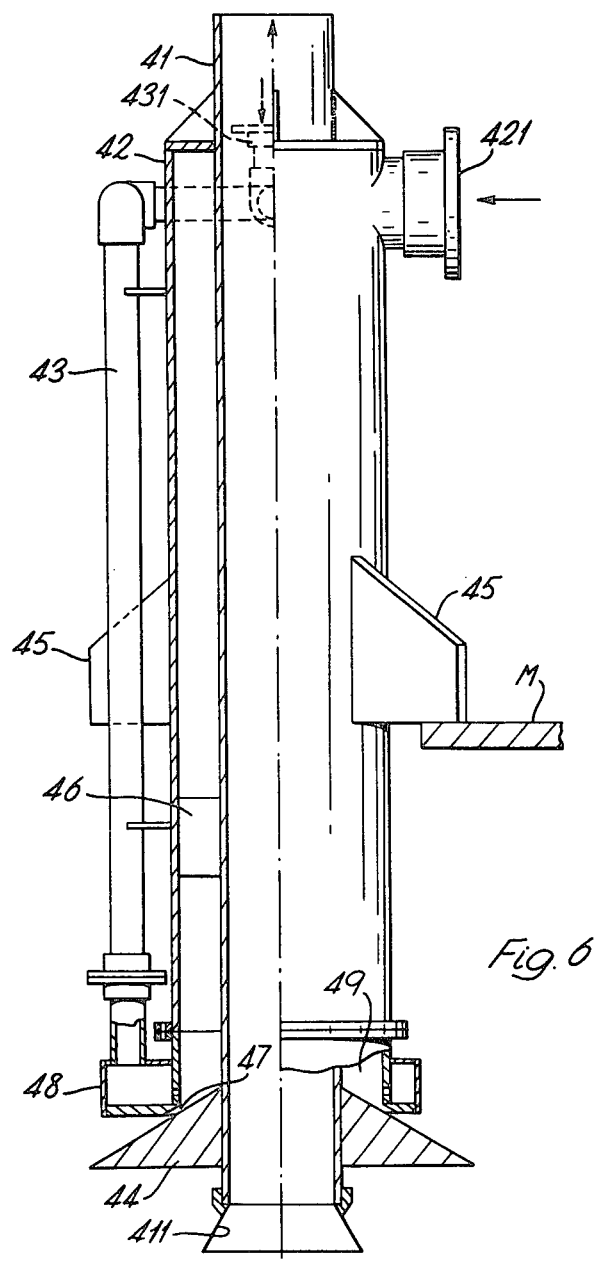
Figure 7:
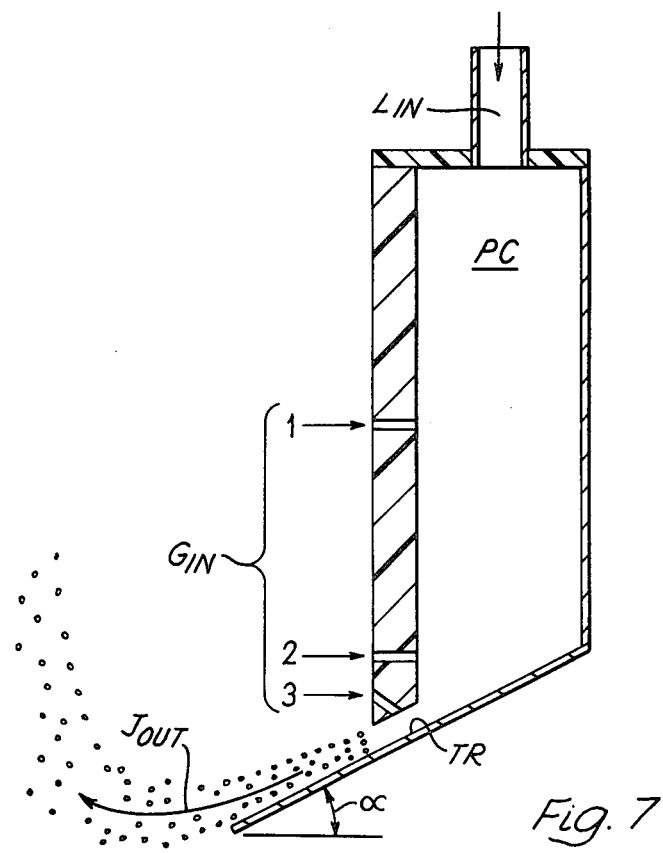

Embodiments of the invention will now be described, by way of example only, with reference to the accompanying drawings in which:

FIG. 1 shows a vertical section of an aerator according to the present invention, and FIGS. 2 and 3 show different equipments incorporating the aerator shown in FIG. 1, FIGS. 4, 5 and 6 show views of a larger aerator according to the invention, and FIG. 7 shows a cross-section of another aerator according to the invention.

Referring then to the drawings, reference numeral 4 indicates the device which, as will be seen, comprises a double-walled vessel 6 defining an unimpeded annular chamber 8 which surrounds an open-ended core region 10 of the device. The inner wall is some 100 mm in diameter and the outer wall about 170 mm in diameter at the level of holes 17.

The chamber 8 terminates in an annular discharge outlet gap 11 the lower surface 12 of which forms part of a generally bell-like shape whilst the upper surface 13 is near vertical. It will be seen that the lower edge of surface 13 terminates close to the lower surface 12, but remote from the bottom edge of surface 12.

The gas inlet 14, for the introduction of gas into chamber 8, comprises twenty-four 3 mm diameter holes 17 formed at equal pitches in surface 13 and backed by a manifold 18 provided with an inlet pipe 19 for connection with an external air supply.

Reference numeral 20 indicates an unrestricted liquid inlet for the introduction of a liquid flow into chamber 8 whilst numeral 22 indicates an alternative position for the gas inlet.

In use, the device 4 is partly immersed in liquid 24 (FIG. 2) contained in a tank 26. A compressed air pipe 28 feeds air into inlet 14 whilst a pump 30 takes water from the top end of core region 10 and returns it to inlet 20 for downward flow through the annular chamber 8. Because of the shape around the discharge outlet gap 11, the liquid/gas (air) mixture issuing in a stream from the outlet will follow a path diagrammatically indicated by numerals 32 so that it circulates through a substantial part of the liquid 24 before entering the core region 10. Reference numerals 33 indicate induced flows.

The bell-like shape of core region 10 is important first because it provides a bellmouth intake promoting a good inflow of water up the core region and secondly because it results in the stream of liquid and air bubbles being discharged into the tank liquid 24 in such a way as to promote the desirable flow patterns such as 32, 33 in a relatively small tank.

As already suggested when the invention was being discussed in general terms, the bottom edge of surface 12 may be serrated if desired, or it may have any other suitably irregular finish so as to encourage turbulence in the liquid/gas mixture leaving the discharge outlet.

Minor variations in the shape of the annular chamber will be acceptable, although in all cases the lower part of chamber 8 should be such that the downward flow of liquid through the chamber prevents bubbles forming in the chamber escaping upwards into the upper part of annulus 8. The large cross-sectional area of unrestricted liquid flow path, particularly in the annular chamber 8, affords a high volume of liquid flow at relatively low velocity easing the pumping duty while still providing an adequate mass × velocity product (momentum) to the outlet stream to ensure a long range penetration by the outlet stream of liquid and introduced gas into the volume of liquid in which the aerator is immersed. As the momentum product is the significant parameter, not the velocity component, the aerator provides efficient penetration of the liquid volume, and thus movement, mixing and aeration throughout the volume, without the high inlet velocity and associated pumping and friction burden of other proposals using "jet" techniques.

If desired, to further reduce the likelihood of the discharge from outlet 11 "short circuiting" the intended path 32 and returning directly into the core region 10, this latter may be provided with a downward extension as indicated in broken lines in FIG. 1 where it is identified by reference numeral 36.

In one embodiment of the invention, water to a depth of 1.2 meters is contained in a 2.4 meter square tank and the aeration device 4 is immersed at the plan centre of the tank with its discharge outlet 11 0.5 meters below the water surface. The gap 11 at this outlet (measured perpendicularly to surface 12 as indicated by the arrows A, B in FIG. 1) is an important parameter in the design of the device. In use of this embodiment, a water flow of 20 cubic meters/hour and an air flow of 57 liters/minute are provided to a 6 mm outlet gap 11. The approximate flow patterns achieved are those illustrated in FIG. 2.

The detailed design of the device and its associated equipment will vary depending on the circumstances in which the device is to be used. Nevertheless, important features of the design are thought to include the individual sizes of the apertures 17, the area of the discharge outlet 11, the ratio of outlet area 11 to the aggregate areas of apertures 17, and the position of the apertures 17 from inlet 14. It is noted that the liquid supply path is not restricted until the outlet from the pressure chamber is approached.

The spacing of inlet 14 and apertures 17 from outlet 11 is important because the size of bubble produced in the device will be dependent on the velocity of the liquid flow into which the air for the bubbles is injected. By having inlet 14 close to outlet 11, the air is injected into the liquid flow through chamber 8 at a region of high velocity and the size of the bubble produced will be correspondingly small.

An important parameter is the angle ($\theta$) at which surface 12 terminates. The value chosen for this angle (30+ to the horizontal in the illustrated embodiment) will depend on tank configuration and the optimum value in a particular situation is conveniently established by experiment. Results so far indicated that usually the optimum value will fall within the range 20°–60°.

Although FIG. 2 shows the device held by an external support structure, it is envisaged that the device could, if desired, be fitted with a flotation collar enabling it to float in the liquid to be aerated. This would make the device especially suited for use as a portable aerator that could readily be moved from one tank to another or along a river.

One such system is shown in FIG. 3 where the device 4 is suspended from a rectangular platform 36 carried on four floats by splayed support arms which are pivotally connected one at each corner of the platform. As FIG. 3 is side view, only two of the floats (38) and two of the support arms (140) can be seen of the complete float assembly.

The water pump and air blower for device 4 are housed inside an enclosure 142 carried on top of the platform.

To vary the depth of immersion of the device in liquid 24, the support arms can be locked at any desired angle by locking pins (not shown) and/or attached at different pivot points 143. In this way the position of the device can be set so that the flow pattern produced will more closely suit the particular volume of liquid under treatment. The broken lines (identified by numeral 144) ndicate one such different position suited to a deeper tank and also how the float assembly might be adjusted to produce this effect.

If desired, the float assembly and the device 4 can be removed from platform 36 to facilitate transport of the equipment.

In another arrangement the aerator, or several aerators, are mounted on a barge or other vessel equipped with a prime mover or a power supply connection to provide power for the pumps associated with the aerator. The vessel can be used on a river or reservoir to provide aeration in the event of pollution or to produce an improvement in the water quality. If the pollution moves with wind or current the vessel with the aerator(s) can be moved to stay with the pollution.

Figure 4:
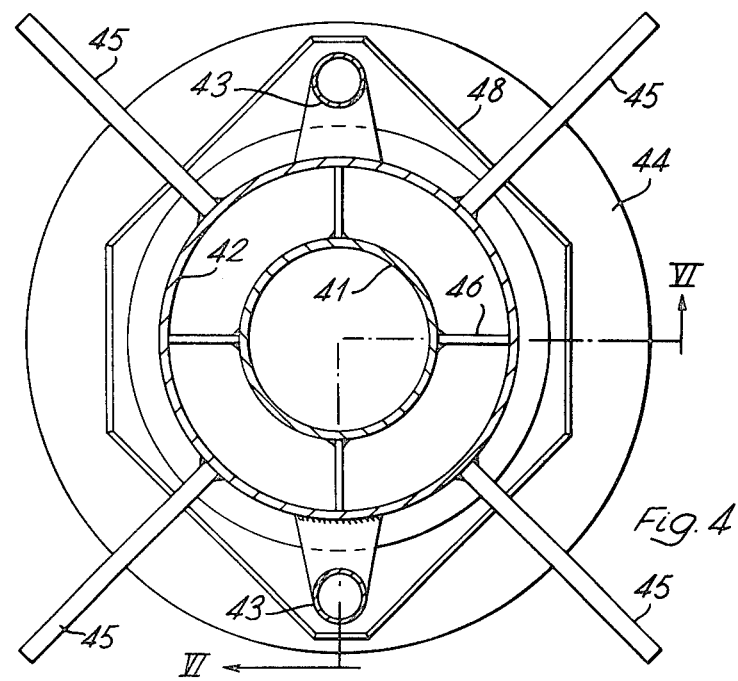

FIGS. 4, 5 and 6 show a larger form of aerator suitable for use on large bodies of water. The aerator is formed from two tubes of UPVC plastics material. The overall length is some 2100 mm. The larger tube 42 is some 400 mm in diameter and the smaller tube is some 200 mm in diameter. Ribs 46 are placed radially around the smaller tube to hold it in position in the larger tube. The ribs 46 also act as flow-straighteners for liquid pumped down the annular space between tubes 41 and 42. The ribs may be augmented by further ribs (not shown) or by tubes (not shown) either being fitted in the annular space below the ribs 46 to provide additional flow-straighteners. Towards one end of the tube 41 is a flared portion 44, which may be a separate body secured to tube 41 or formed in any other convenient manner to remain stable in use. Tube 42 extends close to the surface of portion 44 defining a throat 47 some 5 mm wide. The angle $\alpha$ is similar in value to angle $\theta$ above, i.e. some 20° to 60° and typically 30°. A pressure chamber 49 is formed bounded by flow-straightener ribs 46, or the additional flow-straighteners, the inner part of flared portion 44 and the tubes 41 and 42. The space between tubes 41 and 42 provides a liquid inlet port, liquid being pumped in, in operation, through flanged connection 421. A ring of holes 422, typically 3 mm in diameter one hundred in number and evenly spaced, is provided in tube 42 as a gas inlet. Gas is supplied to holes 422 from a manifold box 48, around the tube 42, in turn supplied by duct 43 from inlet 431. The throat 47 provided the only, restricted, outlet from chamber 49.

In operation when the aerator is immersed in liquid this liquid is pumped up the inside of tube 41, as described above. A cone 411 may be provided to reduce the possibility of drawing liquid directly from throat 47 into tube 41.

Fins, such as 45, are provided to support and secure the aerator on a suitable mounting M, which may be part of a supporting gantry or a hole through a barge or other vessel.

The exact position of the holes 422 with respect to the throat 47 and form of chamber 49 will affect the nature of the stream of liquid and introduced gas bubbles emerging from the throat. In general the smallest bubbles will be obtained when the holes 422 are remote from the throat 47, about 100 mm away in the aerator of FIGS. 4, 5 and 6. Fewer, larger bubbles are obtained when the holes are close to or actually in the throat.

FIG. 7 shows a cross-section of another aerator pressure chamber PC, of similar size to that in FIGS. 4, 5 and 6, with three possible positions for the gas inlet holes shown at $G_{in}^1$, $G_{in}^2$, $G_{in}^3$. The liquid inlet $L_{in}$, is a tube smaller in diameter than the chamber width. This aerator can be made in circular form, as exemplified by FIGS. 4, 5 and 6, or in linear form with distinct, spaced apart liquid and gas inlets.

The aerator was operated immersed in a tank some two meters in diameter with a range of gas flows and liquid flows and the performance assessed from the smallness and density of bubbles in the output jet $J_{out}$. With air supplied at input $G_{in}^3$ and water at $L_{in}$ numerous large bubbles escaped from the throat TR and rose straight up through the surrounding water. Throat TR was at a depth of about one meter. The bubbles in jet $J_{out}$ were large enough to reach the water surface when the downward jet momentum ceased. With air applied at input $G_{in}^2$ little air escaped upwardly from throat TR but the bubbles in jet $J_{out}$ were still large enough to reach the surface. With air applied at input $G_{in}^1$ no air escaped and the bubbles in jet $J_{out}$ were very numerous and of small size. These factors together with the direction imparted by the position of the pressure chamber wall surface adjacent the throat ensure a long "residence time" for the bubbles, i.e. time before reaching the water surface, enhancing absorption of gas, in this case, oxygen. The small bubble size, and consequent relatively large surface area, are believed to result from high shear conditions which the liquid and gas experience in the pressure chamber and throat following full-bore entry into the pressure chamber.

Even when the air supply was increased to produce an air-filled space in the top of the pressure chamber PC the bubbles in $J_{out}$ remained small and numerous. In this case the water supply was 107 Lt/min and the air supply 33 Lt/min. Acceptable performance was also achieved with air supply at 22 and 10 Lt/min, the stream of liquid and bubbles having sufficient momentum to set the contents of the tank in motion.

Operation of the embodiment illustrated in FIG. 1 (i.e. 100 mm inner tube 170 mm outer tube) at a range of water and air flows and gap sizes produced these results:

| | | | | |
|---|---|---|---|---|
| Air flow (m³/hr) | 3.0 | 12 | 12 | 24 |
| Water flow (m³/hr) | 50 | 15 | 30 | 30 |
| Gap (mm) | 5 | 2.2 | 5.0 | 5.0 |
| Oxygen efficiency (kg/kwh)(net) | 0.6 | 1.9 | 1.9 | 1.0 |

(Net efficiency is based on electrical power drawn from supply mains)

The conditions producing an oxygen efficiency of 1.9 kg/kwh energy input indicate the effect of varying the operating conditions on the performance of the aerator and support the belief that the action is one of high shear in a nozzle exit from a flow zone which is constricted towards the exit by the form of the pressure chamber wall deflecting the liquid flow. This is achieved without the need for very small gas supply holes and aligned liquid inlet and outlet with the consequent requirement of precision alignment and the risk of blockage if small bubbles are to be produced for easy absorption. Further an aerator according to the invention has no moving parts in the portion immersed in liquid reducing the risk of failure due to wear or blockage. The large liquid flow areas provided by the full-bore construction permit a high mass flow without excessive liquid supply velocity, providing a good value of momentum (mass × exit velocity) in the liquid/gas stream without the need for high pressure liquid supply.

I claim:

1. An aerator apparatus including an aerator body having a pressure chamber, said pressure chamber having at one end thereof a first inlet for receiving a forced liquid along a selected direction, a wall opposite said first inlet, said wall being directed obliquely to said first inlet direction, a second inlet for a gas disposed between said first inlet and said opposite wall, a restricted chamber throat outlet fixedly directed away from the direction of said first inlet in the line of said oblique wall, the path between said first inlet and said throat outlet being unobstructed, the arrangement being such that liquid and gas supplied to the aerator produce a chamber outlet stream deflected from the first inlet direction of liquid and gas introduced therein to form bubbles in the outlet stream.

2. The aerator as claimed in claim 1 in which said liquid inlet includes a full-bore flow-straightening element of a conduit aligned to said direction and extending to the inlet to the pressure chamber.

3. An aerator according to claim 1 in which the gas inlet is in a chamber wall between the throat and the liquid inlet and nearer to the throat than to the position of the liquid inlet.

4. An aerator according to claim 1 in which the throat tapers down toward the outlet end.

5. An aerator according to claim 1 in which the throat has a wall surface of knife edge form at the outlet end.

6. An aerator according to claim 1 of two tubes of different diameter, a smaller one disposed inside a larger one and along the longitudinal axis, the smaller tube expanding toward the larger one adjacent one end thereof to provide a directed wall surface to define the throat, the gas inlet being in the region of the expansion of the smaller tube and the liquid inlet being along the space between the tubes towards the throat.

7. An aerator according to claim 1 in which the chamber outlet is formed non-uniformly, with serrations or the like, whereby turbulence is produced in the outlet stream.

8. An aerator according to claim 1 mounted on a support being one of a buoyant vessel and a ground-borne structure to support the aerator with the outlet immersed in operation and there being also on the support a prime mover or power supply and pumps for the aerator to feed compressed gas and to pump liquid to the aerator to supply an aerating outlet stream of liquid and gas bubbles with a momentum directed downwardly into the liquid in which the aerator outlet is immersed.

9. An aerator apparatus including an aerator body having a pressure chamber with a first inlet for a forced liquid, a wall in said pressure chamber opposite said first inlet and directed obliquely to said first inlet direction, a second inlet for a gas disposed between said first inlet and said opposite wall, a restricted chamber throat outlet fixedly directed away from the direction of said first inlet in the line of said oblique wall, the arrangement being such that liquid and gas supplied to the aerator produce a chamber outlet stream deflected from the first inlet direction of liquid and gas introduced therein to form bubbles in the outward stream, said apparatus further including two tubes of different diameter, a smaller one of said tubes disposed inside the larger one and along the longitudinal axis thereof, said smaller tube expanding toward the larger one adjacent one end thereof to provide a directed wall surface to define said throat outlet, said second inlet for the gas being in the region of the expansion of said smaller tube and said first inlet for the liquid being along the space between the tubes toward said throat outlet, said smaller tube expanding as a flare at least to the larger tube and said larger tube having an end formed to cooperate with the flare.

10. An aerator apparatus including an aerator body having a pressure chamber with a first inlet for a forced liquid, a wall opposite said first inlet and directed obliquely to said first inlet direction, a second inlet for a gas disposed between said first inlet and said opposite wall, a restricted chamber throat outlet fixedly directed away from the direction of said first inlet in the line of said oblique wall, the arrangement being such that liquid and gas supplied to the aerator produce a chamber outlet stream deflected from said first inlet direction of liquid and gas introduced therein to form bubbles in the outlet stream, said apparatus including a double-walled vessel defining a core portion open at what, in operation of the device, will be the lower end of the core portion, an annular chamber surrounding the core portion, a shaped discharge outlet at what, in operation of the device, will be the lower end of the annular chamber, first inlet means for introducing a liquid flow at what, in operation of the device, will be the upper end of the annular chamber, and a second inlet means for introducing gas into a region of the annular chamber spaced from said upper and lower ends of the chamber, the shaped discharge outlet having a surface effective in operation of the device to encourage fluid leaving the outlet to flow away from the core portion of the device whereby, in operation of the device to aerate a liquid, a liquid/gas mixture discharge from the outlet will tend to circulate through a substantial part of the liquid in which the device is immersed in response to a circulatory flow of said liquid upwardly through the core portion of the device and subsequently downwardly through the annular chamber where the gas is introduced into the flow at the second inlet means.

11. A method of aerating a volume of liquid, including drawing from the volume a supply of liquid, causing the supply of liquid to flow down a conduit into the volume of liquid along a full bore, unobstructed liquid path, causing the liquid flow to be diverted by a surface spaced obliquely across the conduit and restricting the conduit to an outlet throat fixedly directed away from the conduit direction, introducing gas into the liquid flow in the conduit in the region of the outlet throat but upstream of the outlet throat to emerge as a stream of liquid and bubbles of introduced gas with momentum provided by the liquid supply flow and directed by the oblique surface to carry the bubbles downwardly and outwardly in a liquid aerating sense.

* * * * *